(12) United States Patent
Kim et al.

(10) Patent No.: US 9,776,375 B2
(45) Date of Patent: Oct. 3, 2017

(54) RADIANT INSULATION PROTECTOR MANUFACTURING APPARATUS AND RADIANT INSULATION PROTECTOR MANUFACTURED USING SAME

(71) Applicant: AHN Chem Co., LTD, Gyeongsan-si, Gyeongsangbuk-do (KR)

(72) Inventors: Young Soo Kim, Gyeongsan-si (KR); Hyun Kim, Yongin-si (KR); Joo Hun Yi, Daegu (KR)

(73) Assignee: AHN Chem Co., LTD, Gyeongsan-si (KR)

( * ) Notice: Subject to any disclaimer, the term of this patent is extended or adjusted under 35 U.S.C. 154(b) by 254 days.

(21) Appl. No.: 14/793,559

(22) Filed: Jul. 7, 2015

(65) Prior Publication Data

US 2016/0250822 A1     Sep. 1, 2016

(30) Foreign Application Priority Data

Feb. 26, 2015    (KR) .................. 10-2015-0027044

(51) Int. Cl.
*B32B 5/02*    (2006.01)
*F16L 59/02*    (2006.01)
(Continued)

(52) U.S. Cl.
CPC .............. *B32B 5/024* (2013.01); *B21C 37/12* (2013.01); *B21C 37/123* (2013.01); *B32B 1/08* (2013.01);
(Continued)

(58) Field of Classification Search
CPC ....... B32B 1/08; B32B 37/0053; B32B 37/14; B32B 37/142; B32B 37/144; B32B 37/12; B32B 15/14; B32B 15/20; B32B 2307/304; B32B 2307/73; B32B 2605/08; B32B 2457/04; B32B 43/003; Y10T 29/5185; Y10T 29/5198; Y10T 29/5199; Y10T 29/53126; Y10T 29/53526; Y10T 29/5353;
(Continued)

(56) References Cited

U.S. PATENT DOCUMENTS 724,570 A * 4/1903 Greenfield ............ B25B 27/143
29/456
724,571 A * 4/1903 Greenfield ........... H01B 13/262
29/728
(Continued)

FOREIGN PATENT DOCUMENTS

JP     2010512497 A    4/2010
KR    10-0238549 B1    1/2000
KR    100698576 B1    3/2007

*Primary Examiner* — Jason L Vaughan
(74) *Attorney, Agent, or Firm* — Novick, Kim & Lee, PLLC; Jae Youn Kim (57) ABSTRACT

Provided herein are a radiant insulation protector manufacturing apparatus and a radiant insulation protector manufactured using the same which includes a tubular type core member having excellent thermal resistance and durability and an aluminum sheet protection member for external heat radiation overlapped on the core member in a spiral type to wrap the core member, thereby preventing the aluminum sheet protection member from being crumpled and torn and being capable of being directly inserted into an object like a sleeve.

4 Claims, 7 Drawing Sheets

(51) Int. Cl.

| | |
|---|---|
| *F16L 59/08* | (2006.01) |
| *B32B 15/14* | (2006.01) |
| *B32B 1/08* | (2006.01) |
| *B21C 37/12* | (2006.01) |
| *B32B 15/20* | (2006.01) |
| *B32B 5/10* | (2006.01) |
| *B32B 7/06* | (2006.01) |
| *B32B 7/12* | (2006.01) |
| *B32B 29/00* | (2006.01) |
| *B32B 3/14* | (2006.01) |

(52) U.S. Cl.
CPC ............... *B32B 3/14* (2013.01); *B32B 5/10* (2013.01); *B32B 7/06* (2013.01); *B32B 7/12* (2013.01); *B32B 15/14* (2013.01); *B32B 15/20* (2013.01); *B32B 29/002* (2013.01); *F16L 59/027* (2013.01); *F16L 59/08* (2013.01); *B32B 2262/0284* (2013.01); *B32B 2262/101* (2013.01); *B32B 2307/304* (2013.01); *B32B 2307/306* (2013.01); *B32B 2307/748* (2013.01); *B32B 2571/00* (2013.01); *B32B 2597/00* (2013.01); *B32B 2605/08* (2013.01)

(58) Field of Classification Search
CPC ............ Y10T 29/53652; B21C 37/121; B21C 37/123; B21C 37/126; F16L 59/027; F16L 59/028; F16L 59/029; B29C 53/56; B29C 53/58; B29C 53/583; B29C 53/62; B29C 53/64; B29C 53/66; B29C 53/68; B21F 3/04
USPC .............. 242/527.2, 439.6, 439, 439.4, 441; 29/780, 781; 156/392, 425, 428
See application file for complete search history.

(56) References Cited

U.S. PATENT DOCUMENTS

| | | | | |
|---|---|---|---|---|
| 1,004,643 A * | 10/1911 | Gilson | ............... | H01B 13/262 29/728 |
| 1,831,992 A * | 11/1931 | Boynton | ............... | H01B 13/26 29/56.5 |
| 1,883,401 A * | 10/1932 | Rolfs | ............... | B65H 81/08 156/428 |
| 1,976,821 A * | 10/1934 | Wiggins | ............... | H01B 13/26 29/564.1 |
| 2,003,673 A * | 6/1935 | Zapf | ............... | H01B 13/322 29/564.1 |
| 2,343,747 A * | 3/1944 | Chernack | ............... | B21F 17/00 156/144 |
| 2,366,087 A * | 12/1944 | Chernack | ............... | B65H 81/08 156/432 |
| 2,482,702 A * | 9/1949 | Billmeyer | ............... | B29C 69/002 138/125 |
| 2,814,313 A * | 11/1957 | Holbrook | ............... | B29C 53/581 138/141 |
| 2,863,204 A * | 12/1958 | Timothy | ............... | F16L 58/16 118/404 |
| 3,068,133 A * | 12/1962 | Cilker | ............... | B29C 70/32 156/171 |
| 3,128,216 A * | 4/1964 | Reed | ............... | B29C 31/002 156/184 |
| 3,132,416 A * | 5/1964 | Hait | ............... | B21C 37/09 156/143 |
| 3,256,128 A * | 6/1966 | Richardson | ............ | B29C 53/828 138/144 |
| 3,259,533 A * | 7/1966 | Philipson | ............... | B28B 21/925 138/144 |
| 3,444,019 A * | 5/1969 | Storm Van Leeuwen | ............... | B29C 31/002 156/156 |
| 3,533,882 A * | 10/1970 | Riese | ............... | B31C 3/00 156/189 |
| 3,823,883 A * | 7/1974 | Fencl | ............... | F16L 9/04 242/444 |
| 3,993,531 A * | 11/1976 | Davila | ............... | H01B 13/0883 118/410 |
| 4,010,054 A * | 3/1977 | Bradt | ............... | B29C 53/566 156/173 |
| 4,113,545 A * | 9/1978 | Stuart, Jr. | ............... | B29C 63/14 156/392 |
| 4,125,422 A * | 11/1978 | Stuart, Jr. | ............... | B65H 81/08 156/392 |
| 4,197,348 A * | 4/1980 | Townsend | ............... | H01F 41/122 156/169 |
| 4,261,785 A * | 4/1981 | Hunter | ............... | B65H 81/08 156/392 |
| 4,416,721 A * | 11/1983 | Deregibus | ............... | B29C 53/581 156/185 |
| 4,597,276 A * | 7/1986 | Legallais | ............... | B21C 37/121 72/49 |
| 4,612,759 A * | 9/1986 | Meijer | ............... | H01B 13/26 242/439.6 |
| 4,724,596 A * | 2/1988 | Pavlyak | ............... | B21C 37/121 138/135 |
| 4,738,008 A * | 4/1988 | Proctor | ............... | B21C 37/12 29/33 D |
| 4,783,980 A * | 11/1988 | Varga | ............... | B21C 37/124 72/49 |
| 4,895,011 A * | 1/1990 | Varga | ............... | B21C 37/12 242/364.1 |
| 5,046,558 A * | 9/1991 | Koster | ............... | E21B 33/127 156/392 |
| 5,261,982 A * | 11/1993 | Yoshino | ............... | B65H 81/08 156/191 |
| 5,537,745 A * | 7/1996 | Musch | ............... | B05C 17/0207 29/33 D |
| 5,798,013 A * | 8/1998 | Brandenburger | ..... | B29C 53/382 156/188 |
| 6,179,008 B1 * | 1/2001 | Kawazura | ............... | B29C 47/023 138/125 |
| 6,435,244 B1 * | 8/2002 | Shieh | ............... | D21G 1/0233 156/425 |
| 6,869,493 B2 * | 3/2005 | Tsai | ............... | H01B 13/0816 156/148 |
| 6,887,543 B1 * | 5/2005 | Louart | ............... | B29D 23/001 138/118 |
| 7,243,697 B2 * | 7/2007 | Daykin | ............... | F16L 58/181 156/392 |
| 7,410,550 B2 * | 8/2008 | Sherwin | ............... | F16L 59/021 156/190 |
| 8,756,788 B2 * | 6/2014 | Espinasse | ............... | B21C 37/12 29/455.1 |
| 8,955,362 B2 * | 2/2015 | Booth | ............... | B21C 37/12 72/49 |
| 2011/0271730 A1* | 11/2011 | Curtis | ............... | B21C 37/121 72/142 |
| 2011/0277525 A1* | 11/2011 | Curtis | ............... | B21C 37/121 72/199 |
| 2012/0036910 A1* | 2/2012 | Leedham | ............... | B21C 37/12 72/129 |
| 2012/0042705 A1* | 2/2012 | Curtis | ............... | B21C 37/121 72/129 |

* cited by examiner

RADIANT INSULATION PROTECTOR MANUFACTURING APPARATUS AND RADIANT INSULATION PROTECTOR MANUFACTURED USING SAME

BACKGROUND OF THE INVENTION

Field of the Invention

The present invention relates to a radiant insulation protector manufacturing apparatus and a radiant insulation protector manufactured using the same, and, more particularly, to a radiant insulation protector manufacturing apparatus and a radiant insulation protector manufactured using the same which includes a tubular type core member having excellent thermal resistance and durability and an aluminum sheet protection member for external heat radiation overlapped on the core member in a spiral type to wrap the core member, thereby preventing the aluminum sheet protection member from being crumpled and torn and being capable of being directly inserted into an object like a sleeve.

Background Art

In general, radiant insulation protectors are used in hoses or tubes requiring insulation, such as fuel lines, brake lines, engine wire harnesses and cable assemblies of vehicles. Particularly, because engines or exhausts are high in temperature, rubber hoses or plastic tubes around the engine or exhaust need protection from external heat, and hence, radiant insulating materials are applied thereto.

Moreover, in order to satisfy demands for improvement of fuel efficiency and weight reduction, downsizing of automobile parts is increased, and use of radiant insulating materials is increasing in order to secure thermal resistance of fuel hoses of an engine room which has a small space and generates high temperature.

Recently, with sudden increase of resource consumption due to economic growth of developing countries, because rise of oil price is expected to continue, energy-related countermeasures is urgent in automobile-related industry fields in an aspect of energy security. Furthermore, because global warming that threatens existence of human beings has emerged as a social problem, Europe and the United States which are the advanced automobile markets established the transport field as a focused field to reduce $CO_2$ emissions and government in every country is in the process of reducing emission quantity through regulations for enforcing improvement of fuel efficiency.

According to the regulation strengthening of fuel efficiency and exhaust gas in every country, there is a rising interest in expansion of vehicle mileage and improvement of fuel efficiency, and the demands on improvement of fuel efficiency are extended to studies on increase of use of lightweight vehicle parts and reduction of volume so that the number of parts for satisfying convenience, safety and environmental compatibility in a limited size of the engine room is on the rising.

Such environment causes a phenomenon that lots of parts are dense in the small engine room, and especially, because fuel hoses are attached to the engine of high temperature, development of radiant insulating materials with excellent radiant insulation performance is in dire need.

As an example of conventional radiant insulating materials, Korean Patent No. 10-0238549 discloses a method of producing soundproofing and adiabatic material for automobiles which comprises the steps of overlapping glass fiber on polyurethane, overlapping nonwoven fabrics or aluminum foil on and below the glass fiber and polyurethane, and press-forming and cutting them.

Figure 1:
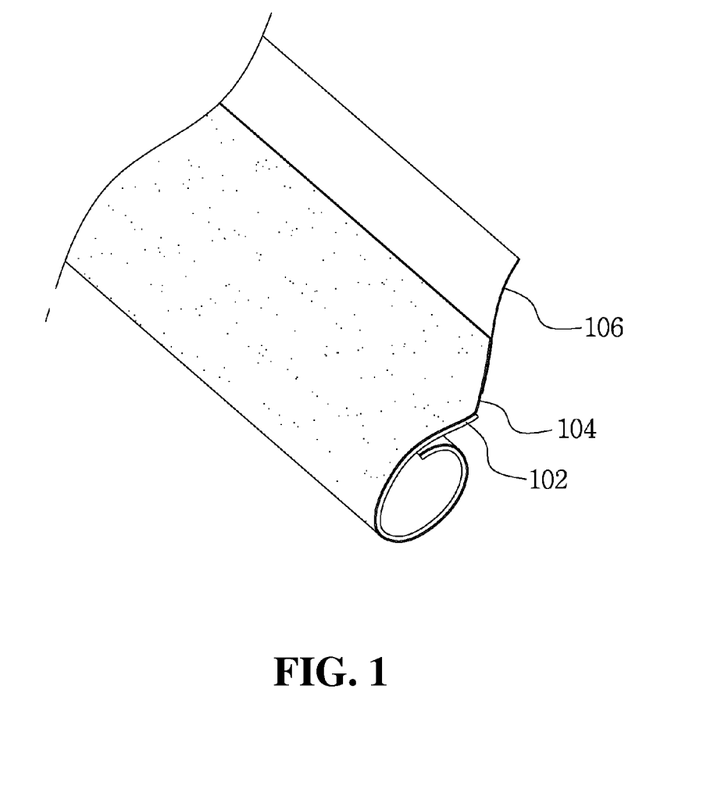
FIG. 1 is a perspective view of a radiant insulation protector according to a prior art.

However, such radiant insulating materials are mainly used in plate type products. Therefore, in order to use the radiant insulating materials to hoses or tubes requiring insulation, such as fuel lines, brake lines, engine wire harnesses and cable assemblies of vehicles, as shown in FIG. 1, wrap type radiant insulating materials each of which has a release paper 106 attached to an end portion of an aluminum sheet 104 adhered on the outer surface of an insulating material 102 have been manufactured and used. Therefore, the conventional radiant insulating materials have several disadvantages in that it takes lots of time to be adhered on an object because it is inconvenient to remove the release paper 106 and adhere the radiant insulating material, in that the radiant insulating material tears in the length direction of the product, in that the aluminum sheet 104 is frequently folded when being used and it causes cracks tearing at the folded part, and in that the adhered part of the aluminum sheet 104 may be exfoliated when the insulating material is used for a long time after being adhered.

SUMMARY OF THE INVENTION

Accordingly, the present invention has been made to solve the above-mentioned problems occurring in the prior arts, and it is an object of the present invention to provide a radiant insulation protector manufacturing apparatus and a radiant insulation protector manufactured using the same which includes a tubular type core member having excellent thermal resistance and durability and an aluminum sheet protection member for external heat radiation overlapped on the core member in a spiral type to wrap the core member, thereby preventing the aluminum sheet protection member from being crumpled and torn and being capable of being directly inserted into an object like a sleeve.

To accomplish the above object, according to the present invention, there is provided a radiant insulation protector manufacturing apparatus including: a supply part for continuously supplying a core member of a tubular fabric form with thermal resistance; a guide part mounted on a work table to guide the core member; a mandrel part longitudinally disposed inside the core member guided through the guide part to support the core member; conveying roller parts opposed to each other to compress and convey the core member; a forming part overlapped on the outer surface of the core member in a spiral type to wrap an aluminum sheet protection member while rotating around the core member; and a cutting part for cutting a protector manufactured through the forming part into a predetermined length.

In another aspect of the present invention, there is provided a radiant insulation protector manufactured by the manufacturing apparatus and comprising a protection member which is formed on the outer surface of a core member of a tubular fabric type formed using weft yarns of thermoplastic PET monofilament yarns and warp yarns of glass fiber yarns or PET multifilament yarns to doubly wrap an aluminum sheet around the outer surface of the core member in the spiral form and is inserted into an object of a hose type or a tube type.

According to the present invention, the radiant insulation protector manufacturing apparatus and the radiant insulation protector manufactured using the same can prevent the aluminum sheet protection member from being crumpled and torn because including the tubular type core member having excellent thermal resistance and durability and the aluminum sheet protection member for external heat radiation overlapped on the core member in a spiral type to wrap the core member and can be directly inserted into an object like a sleeve because the radiant insulation protector is formed in a tubular form so as to enhance work efficiency.

Furthermore, after thermoforming of the tubular type core member, because forming of the aluminum sheet protection member and cutting of the completed protector are carried out in a continuous line, the present invention can come off the assembly line so as to reduce manufacturing costs, and can prevent exfoliation of the aluminum sheet after adhesion because there is no bonded joint when the aluminum sheet protection member is formed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, reference will be now made in detail to the preferred embodiments of the present invention with reference to the attached drawings.

Figure 2:
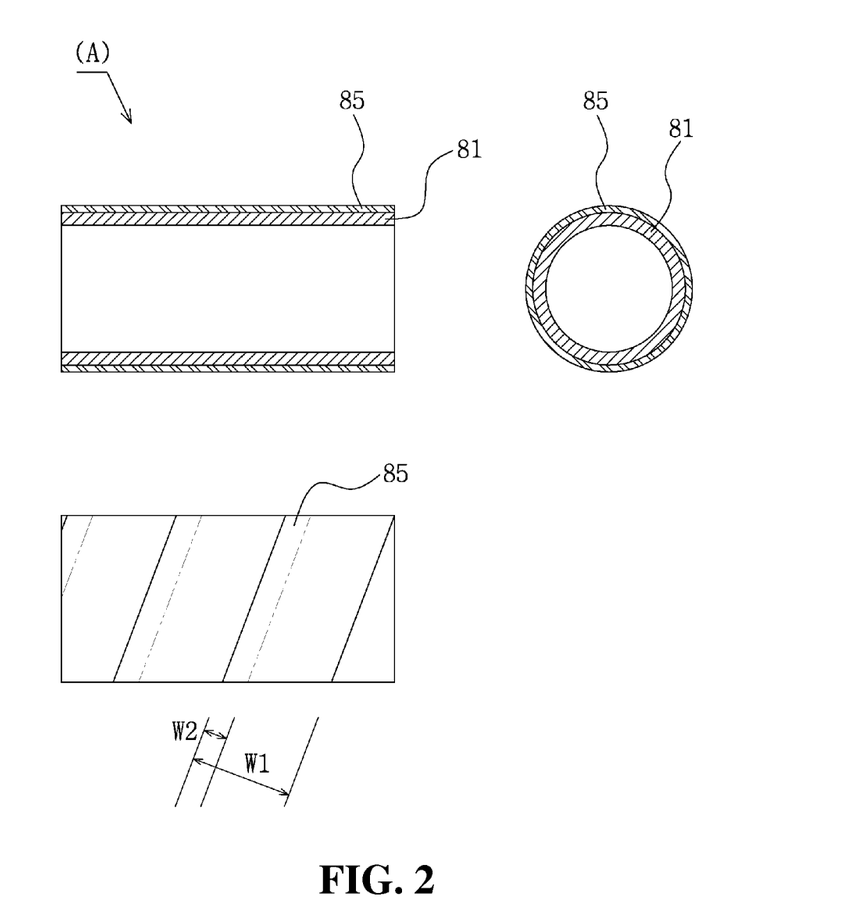
FIG. 2 is a sectional view of a radiant insulation protector according to the present invention.
Figure 3:
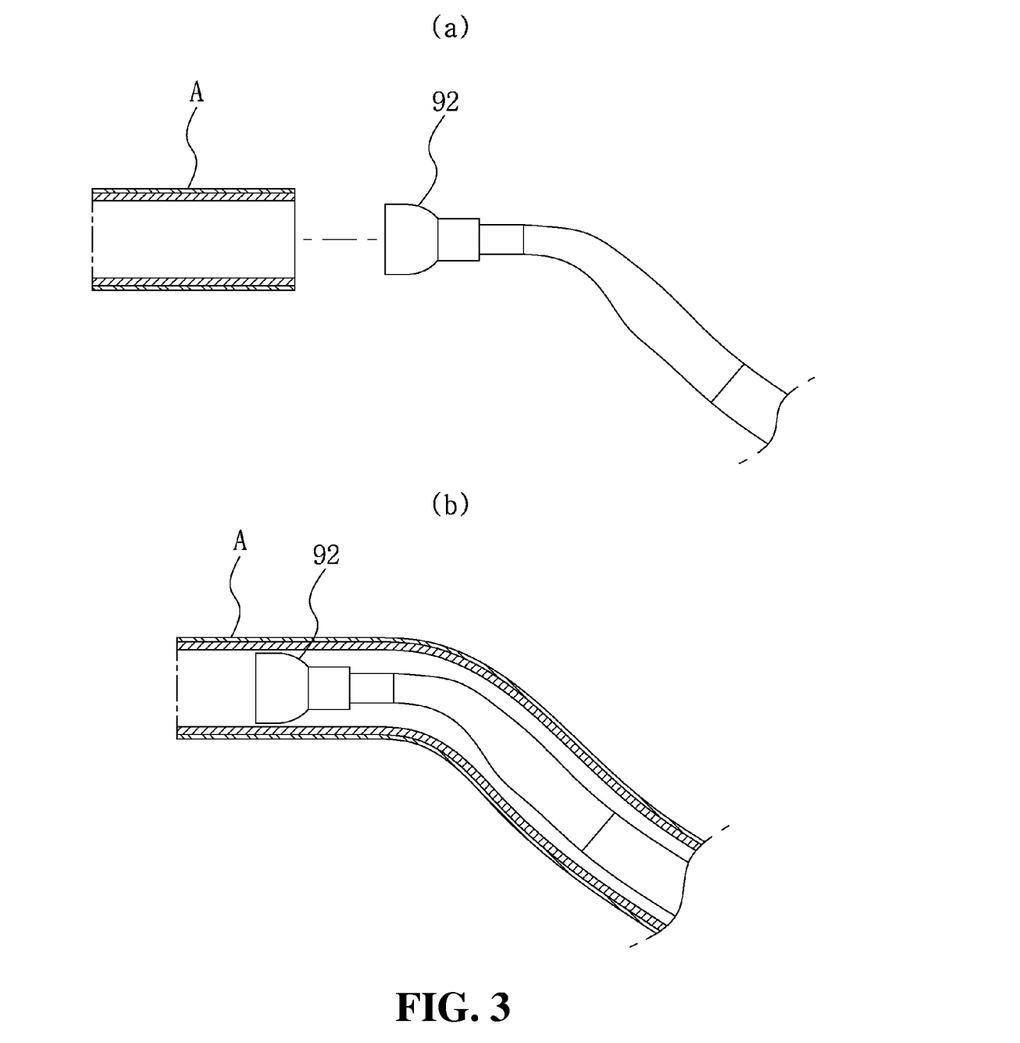
FIG. 3 is a view showing a used state of the radiant insulation protector according to the present invention.

A radiant insulation protector manufactured using a radiant insulation protector manufacturing apparatus according to the present invention is mainly used in hoses or tubes requiring insulation, such as fuel lines, brake lines, engine wire harnesses and cable assemblies of vehicles in order to protect the hoses or tubes from external heat. Referring to FIGS. 2 and 3, an aluminum sheet protecting member 85 is overlapped on the outer surface of a core member 81 of a tubular fabric type in a spiral form to wrap the core member 81, and then is inserted into an object 92.

The core member 81 is formed into a fabric type using thermoplastic PET monofilament yarns which are weft yarns and glass fiber yarns or PET multifilament yarns which are warp yarns, and is formed in a tubular form in order to be directly inserted into a hose or a tube used in a vehicle to protect the hose or tube.

The thermoplastic PET monofilament yarns which are used as weft yarns has thermoplasticity which is the property to cause permanent transformation by actions of heat and power, and is used to maintain the tubular form after thermoforming. Moreover, the thermoplastic PET monofilament yarns are strong in tensile strength, have little increase of electric resistance, are low in rate of standard change due to water absorption, and is excellent at thermal resistance and chemical resistance. In this instance, it is preferable that the thermoplastic PET monofilament yarns be 0.2 to 1.2 mm.

The glass fiber yarns which are warp yarns are artificial fiber made of long and thin glass with small alkali ingredients, and are widely used as insulating materials, sound-proofing materials, insulators, filter media, and materials for optical communication because they are excellent at thermal resistance, corrosion resistance and wet-injury resistance. Additionally, a yarn twisting process using the triple twisted yarn method is applied to the glass fiber yarns in order to prevent fiber flocks, and if there are severe flocks, sizing may be added.

The PET multifilament yarns have the most incorruptible and highest crystalline molecular structure out of artificial fiber, and have great specific gravity but low hygroscopicity. Moreover, the PET multifilament yarns are strong in acid but is decomposed in strong alkali. However, because the PET multifilament yarns have relatively high alkali resistance, the PET multifilament yarns are hardly damaged even at high temperature in thin alkali. The PET multifilament yarns are the highest in heat resistance out of artificial fibers because the PET multifilament yarns have a fusion point of 256 to 260° C. Differently from nylon, the PET multifilament yarns are not discolored even though they are exposed to heat for a long time. Furthermore, because the molecular chain is short and crystallizability is big, the PET multifilament yarns are worse in elastic recovery than nylon fiber or acrylic fiber, but is excellent at dimensional stability, intensity and fatigue resistance.

A protection member 85 is formed on the outer surface of the core member 81 formed in the tubular fabric type using the weft yarns of the thermoplastic PET monofilament yarns and the warp yarns of the glass fiber yarns or PET multifilament yarns to doubly wrap the outer surface of the core member 81 in the spiral form.

Because fabrics becomes somewhat elongated, if a great tension is applied to the fabrics, the outward appearance and quality are automatically secured. However, because aluminum is not elongated but is crumpled or torn, the present invention adopts the method that the protection member 85 wraps the core member 81 in the spiral form. Preferably, the aluminum sheet protection member 85 is spirally wound on the outer surface of the core member 81 in such a way as to form overlapped areas. As shown in FIG. 2, the overlapped width (W2) of the aluminum sheet is 15 to 30% of the standard width (W1) of the aluminum sheet so that the protection member 85 is sufficiently overlapped so as to provide durability and prevent the protection member from being torn or damaged. In this instance, if the overlapped width (W2) is less than 15% of the standard width (W1), the overlapped parts on the core member 81 may be omitted or may be in disorder. If the overlapped width (W2) exceeds 30%, raw materials are wasted and work efficiency is deteriorated due to excessive overlapped parts.

Reflective insulating materials using aluminum, such as aluminum sheets, insulate radiant heat. Because metal ingredients of the reflective insulating material causes thermal conduction to reduce thermal insulating effect if there is no air layer, thermal insulating materials woven with glass fiber and PET fiber are used inside the aluminum sheet. The reflective insulating materials are mainly used at an area where high heat is generated, and the use of the reflective insulating materials is on a rising trend in order to secure thermal insulation in small spaces, such as automobiles. Such a trend is a matter to be essentially examined in the automobile business which needs to minimize the space in designing of automobiles. Use of the reflective insulating materials gradually expands to machines and electrical equipment which use various thermal fluids.

In the meantime, referring to FIGS. 4 to 7, an apparatus for manufacturing radiant insulation protectors includes a supply part 10, a guide part 20, a mandrel part 30, a conveying roller part 40, a forming part 50, and a cutting part 60.

Figure 4:
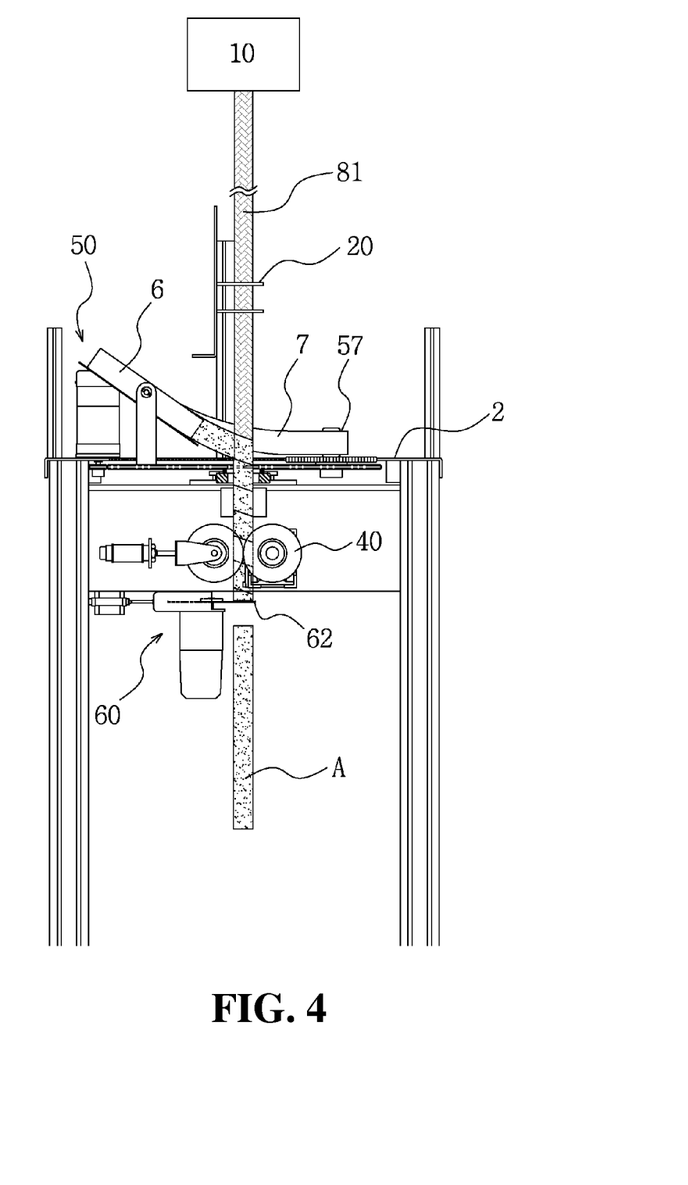
FIG. 4 is a side view of a radiant insulation protector manufacturing apparatus according to the present invention.
Figure 5:
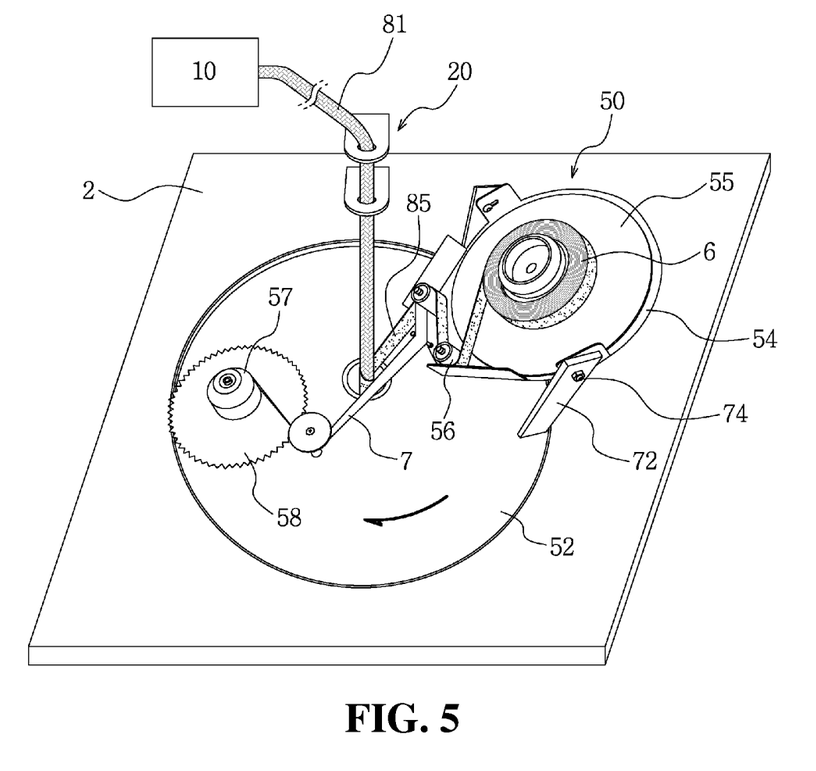
FIG. 5 is a perspective view of an upper part of a work table of the radiant insulation protector manufacturing apparatus according to the present invention.

The supply part 10 is configured to continuously supply the core member 81 formed in the tubular fabric type using the weft yarns of the thermoplastic PET monofilament yarns and the warp yarns of the glass fiber yarns or PET multifilament yarns. The supply part 10 is connected to the core member 81 which has been previously manufactured or a manufacturing device of the core member 81 so that the core members 81 can be manufactured in a continuous line.

The guide part 20 is disposed on the work table 2 to stably guide the core members 81. Preferably, the guide part 20 is formed in a ring shape to prevent separation of the core members 81 and stably guide the core members 81. As shown in FIGS. 4 and 5, the guide part 20 is configured to stably supply the core members 81 in the vertical direction.

Figure 7:
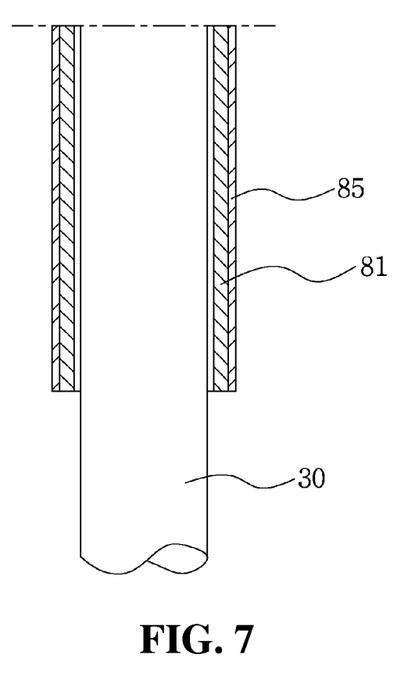
FIG. 7 is a sectional view showing a mandrel part according to the present invention.

In order to tightly adhere the aluminum sheet protection member 85 on the outer surface of the core member 81 guided through the guide part 20, the outer surface of the core member 81 is pressurized. In this instance, in order to support the inside of the core member 81 and keep the tubular form of the core member 81, as shown in FIG. 7, the mandrel part 30 is disposed inside the core member 81 in the longitudinal direction.

The mandrel part 30 passes the conveying roller part 40 from the guide part 20 so that the protection member 85 is stably adhered in the spiral type and stably moves.

The core member 81 is moved by the conveying roller part 40 mounted on the work table 2. As shown in FIG. 4, the conveying roller part 40 is mounted below the work table 2, and rollers are respectively mounted on the opposite sides of the core member 81 moved downwardly in the vertical direction, so that the core member 81 is moved by rotating pressure of the rollers. Because the mandrel part 30 is disposed inside a protector (A) moved from the conveying roller part 40, it makes stable pressurization and movement possible. Furthermore, the conveying roller part 40 may be formed in multiple forms.

The conveying roller part 40 is made of a urethane material, is processed to become concave to be fit to the outer diameter of the protector (A), and then, gets in contact with both sides of the protector (A). In this instance, when both urethane rollers are rotated, the protector (A) is conveyed by friction, and then, a compressor is connected to press to the urethane rollers pneumatically. In addition, a pneumatic tool may be mounted in order to control pressure when the urethane rollers are pressed. When the urethane rollers convey and compress the protector (A), the aluminum sheet protection member 85 is compressed to the fabric core member 81 and the quality of the outward appearance is improved.

Figure 6:
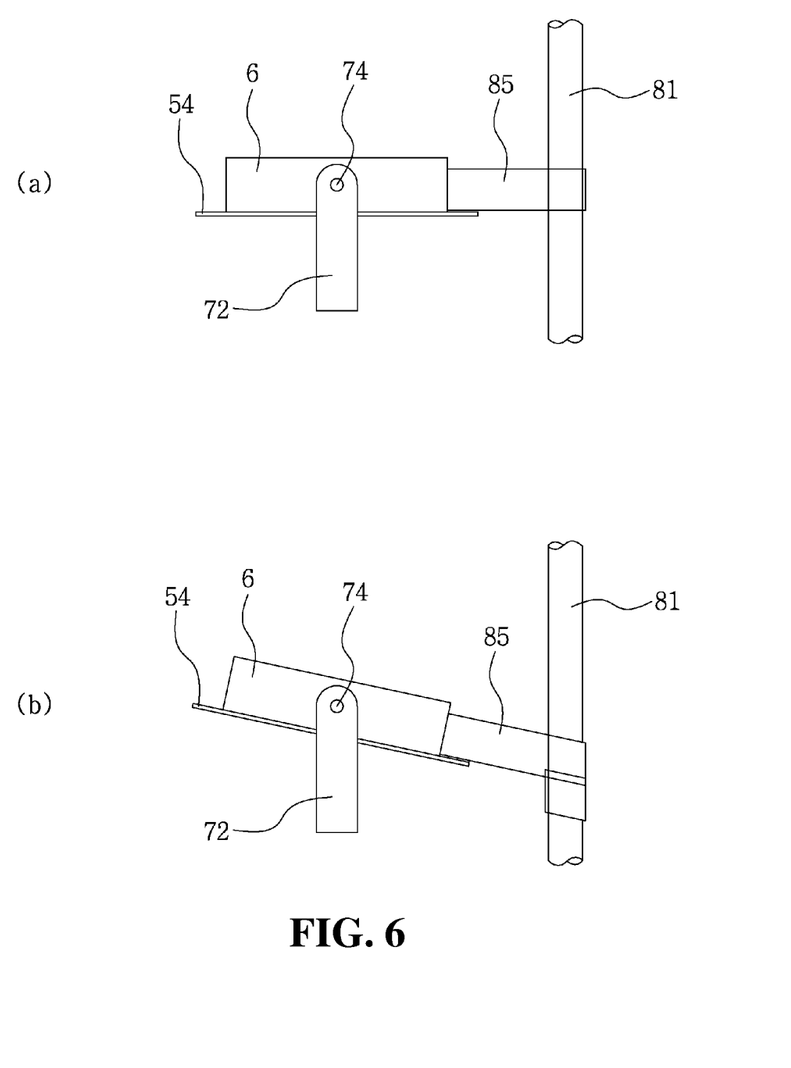
FIG. 6 is a view showing a used state of a sheet supplier which is automatically controlled in angle according to movements of a core member and speed of a rotor according to the present invention.

While the core member 81 is moved downwardly in the vertical direction, the forming part 50 for forming the protection member 85 on the outer surface of the core member 81 is disposed. As shown in FIG. 5, the forming part 50 is mounted on the work table 2 and rotates around the core member 81 to make the aluminum sheet protection member 85 be overlapped on the core member 81 in the spiral form to wrap the core member 81. For this, the forming part 50 includes: a rotor 52 rotating around the core member 81 on the work table 2; and a sheet supplier 54 mounted on the rotor 52 and rotating around the core member 81 to supply the aluminum sheet protection member 85. As shown in FIGS. 5 and 6, the sheet supplier 54 is automatically controlled in angle according to the movement of the core member 81 and speed of the rotor 52 in a state where the sheet supplier 54 is connected to a hinge shaft 74 between a pair of brackets 72, which hold the center of gravity, to keep level, so that the overlapped width of the protection member 85 can be controlled.

In this instance, if movement of the core member 81 becomes faster or the speed of the rotor 52 becomes slower, the angle of the sheet supplier 54 is increased so that the overlapped width of the protection member 85 becomes narrower. If movement of the core member 81 becomes slower or the speed of the rotor 52 becomes faster, the angle of the sheet supplier 54 is decreased so that the overlapped width of the protection member 85 becomes wider. Using the above-mentioned principle, the overlapped width of the protection member 85 can be controlled.

By the above structure, because the aluminum sheet protection member 85 automatically finds the angle according to linkage speed, tension between the upper side and the lower side of the protection member 85 is uniform, and hence, it prevents wrinkles of the protection member 85 and improves quality of the outward appearance.

The sheet supplier 54 includes: a holder 55 on which a sheet roll 6 is seated; a guide roller 56 to which the aluminum sheet protection member 85 is moved; and a release paper winding roll 57 wound on the rotor 52 after the release paper 7 of the sheet is removed. In this instance, when the release paper winding roll 57 is mounted on a rotation member 58 which is operated in interlock with the rotor 52 or operated independently and the guide roller 56 has an eccentric shaft (not shown) so as to control tension when the aluminum sheet protection member 85 is moved, because a tensile force is generated on the guide roller 56.

The cutting part 60 for cutting the protector (A) manufactured through the forming part 50 into a predetermined length is mounted below the conveying roller part 40. The cutting part 60 includes a cutting blade 62 which moves back and forth or rotates toward the protector (A). The cutting blade 62 is operated by a motor. The cutting part 60 can be adjusted according to length of the protector (A), and can be automatically controlled using a photo sensor for sensing products and a timer.

The operation of the radiant insulation protector manufacturing apparatus according to the present invention will be described as follows.

First, the core member 81 of the tubular fabric type formed using the weft yarns of the thermoplastic PET monofilament yarns and the warp yarns of the glass fiber yarns or PET multifilament yarns is supplied through the supply part 10, and then, is moved downwardly in the vertical direction through the guide part 20.

The core member 81 moved in the vertical direction is continuously moved downwardly while keeping its form by the mandrel part 30, and in this instance, is pressurized and moved by the conveying roller part 40 mounted below the work table 2.

In the state where the core member 81 is moved, the aluminum sheet protection member 85 is supplied from the sheet supplier 54 mounted on the rotor 52 of the forming part 50. In this instance, the sheet supplier 54 mounted on the hinge shaft 74 between the brackets 72 is automatically controlled in its angle according to the movement of the core member 81 and the speed of the rotor 52 so that the protection member 85 is inclinedly overlapped and wraps the core member 81 in the spiral form.

When the aluminum sheet protection member 85 is formed to the core member 81, the release paper 7 adhered on the protection member 85 is separated in the vicinity of the guide roller 56 and is wound on the release paper winding roll 57 while moving by the guide members.

The protector (A) manufactured through the above continues the downward movement from the work table 2, passes the conveying roller part 40, and then, is cut by the cutting part 60. Through the above steps, the work is completed.

What is claimed is:

1. A radiant insulation protector manufacturing apparatus comprising:
    a supply part for continuously supplying a core member of a tubular fabric form with thermal resistance;
    a guide part mounted on a work table to guide the core member;
    a mandrel part longitudinally disposed inside the core member guided through the guide part to support the core member;
    conveying roller parts opposed to each other to compress and convey the core member;
    a forming part overlapped on the outer surface of the core member in a spiral type to wrap an aluminum sheet protection member while rotating around the core member; and
    a cutting part for cutting a protector manufactured through the forming part into a predetermined length.

2. The radiant insulation protector manufacturing apparatus according to claim 1, wherein the forming part comprises: a rotor rotating around the core member on the work table; and a sheet supplier mounted on the rotor and rotating around the core member to supply the aluminum sheet protection member, and
    wherein the sheet supplier is automatically controlled in angle according to the movement of the core member and speed of the rotor in a state where the sheet supplier is connected to a hinge shaft between a pair of brackets, which hold the center of gravity, to keep level, so that an overlapped width of the protection member can be controlled.

3. The radiant insulation protector manufacturing apparatus according to claim 2, wherein the sheet supplier comprises: a holder on which a sheet roll is seated; a guide roller to which the aluminum sheet protection member is moved; and a release paper winding roll wound on the rotor after the release paper of the sheet is removed.

4. The radiant insulation protector manufacturing apparatus according to claim 3, wherein the guide roller has an eccentric shaft so as to control tension when the aluminum sheet protection member is moved.

* * * * *